Patented June 7, 1932

1,861,685

UNITED STATES PATENT OFFICE

LOUIS T. BUSSLER, OF ASHTON, MARYLAND

DETERGENT COMPOSITION AND PROCESS OF MAKING THE SAME

No Drawing.   Application filed October 6, 1926.   Serial No. 139,955.

This invention relates to detergents and particularly to a detergent of high efficiency adapted for a very wide range of uses.

An important object of this invention is to provide a composition having greater detergent efficiency than soap or other cleaning agents heretofore employed.

Another object of the invention is to provide a detergent of general applicability and which also is adapted for other important uses in the arts.

A further object of the invention is to provide a composition adapted for detergent and other uses having high colloidal activity and emulsifying properties.

A further object of the invention is to provide a detergent adapted to be efficiently used in or with soft or hard water or brine, either hot or cold, a particularly advantageous feature of my detergent being its adaptability for satisfactory use in either hard or salt water even when cold.

A further object of the invention is to provide a detergent having little or no free alkali and which has the minimum injurious effect upon delicate fabrics, fibers, and other materials or surfaces cleaned therewith.

A further object of the invention is to provide a detergent having strong insecticidal, deodorizing and germicidal action and which is harmless to human beings and animals.

A further object of the invention is to provide a detergent which can be manufactured ready for use from the raw materials within a few hours and with the minimum labor and equipment and which can be produced at a low cost.

Other objects and advantages will be apparent from the following description.

I have discovered that amino-fatty acids and to some extent their water soluble derivatives as for example their esters or salts, have pronounced detergent action particularly in association with gelatinous material, and use is made of this discovery in the preparation of my improved composition.

Amino-fatty acids are commonly regarded as dihydric acids in which the alcoholic hydroxyl is replaced by the amido-group, nitrogen di-hydrogen, $NH_2$. It is, however, simpler to consider them as being amino-derivatives of the monobasic fatty acids produced by the replacement of one hydrogen atom thereof by the amido-group.

Several of these amino-fatty acids occur already formed in plant and animal organisms but amino-fatty acids can readily be obtained from proteins by heating them with hydrochloric acid or alkalis or by the action of ferments or bacteria. Various other methods for their production are known but they can more economically be produced from protein matter than otherwise and I prefer to produce them by acting upon glue, gelatin, blood, casein, mucin, albumen, vegetable protein such for example as is present in soy beans, cottonseed, etc., or other proteid containing matter with a suitable alkali.

These amino-fatty acids vary widely in composition according to their source. They are readily soluble in water and when pure, ordinarily have a sweet taste and usually are insoluble in alcohol and ether. In the commercial production of them in making my detergent I have observed that the product ordinarily has the smell of ammonia but this may be due to the character of the materials employed, or to the manner in which the protein containing matter is treated in commercial practice whereby some decomposition of the amino-fatty acids may occur with the liberation of a small amount of ammonia. Amino-fatty acids contain both a carboxyl and an amido-group and accordingly when pure, behave as both acids and bases but show a neutral reaction. In their commercial production, however, in my process the crude product obtained by the treatment of proteid containing matter with alkali such for example as a relatively small quantity of sodium hydroxid or sodium perborate, exhibits a slight alkaline reaction possibly due to the production of a small amount of ammonia or some other alkaline byproduct.

Amino-fatty acids, as I have discovered, possess detergent properties but are not particularly well suited for practical use as cleaning agents without further treatment as by the addition thereto of gelatinous material which in association with the amino-fatty acids furnishes a product which has the desired viscosity and as appears from my investigations, a high colloidal activity. In this addition to the amino-fatty acids I may employ starch or a starch containing substance such for example as corn meal, so treated in my process as to show no starch structure under microscopical examination and to become substantially gelatinous, or I may employ some other gelatinous substance such for example as gelatin, glue or the like. I also may employ as the gelatinous substance gelatinized cellulose such for example as that produced by the action of acetin on cellulose or a cellulose ester or materials containing cellulose or a cellulose ester. In practice in making use of gelatinized cellulose, I prefer to employ cottonseed meal or soy bean meal or both (which materials in addition to their cellulose content contain some proteid matter) treated with preferably about 1 per cent. by weight of acetin to effect gelatinization. Where I make use of the cellulose product thus produced I prefer to treat the gelatinized product obtained from the cottonseed or soy bean meal and the main supply of protein matter simultaneously with the alkali or other amino-fatty acid producing reagent to obtain the amino-fatty acids from both sources of proteid containing material in a single operation. Where starch or starchy material is employed for the purpose of modifying the amino-fatty acids I prefer to add it to the product obtained by the treatment of the proteid containing material with the alkali although both the protein matter and the starch may be treated with the amino-fatty acid producing reagent. The starch upon being mixed with the amino-fatty acids in the practice of my process as actually carried out commercially, swells, loses its starch structure and becomes substantially gelatinous so that such swollen and structureless starch is contemplated as being embraced within the term "gelatinous material" as employed herein.

The amino-fatty acids which have been given increased viscosity by the addition thereto of gelatinous material such as gelatine, gelatinized starch or gelatinized cellulose or cellulose derivative are hereinafter termed "modified amino-fatty acids" but it is to be understood that this term has reference to the modification in the properties of such amino-fatty acids whereby their viscosity is increased and their suitability for detergent action improved and not to any modification of the chemical composition or molecular arrangement of such acids. It may be that some chemical union of the amino-fatty acids and the gelatinous material occurs but if so, it has not been determined.

In the practice of my invention as herein before outlined I may advantageously treat cellulose or a cellulose ester or derivative but preferably cottonseed meal, or soy bean meal, or both, with a gelatinizing agent, preferably with about 1 per cent. by weight of acetin for preferably about 20 minutes, no external heat being applied, and to the resulting gelatinized product I add an approximately equal quantity by weight of protein matter preferably glue or other gelatine containing protein material and from 3 to 5 per cent. by weight of the mass of commercial sodium hydroxid. The mass is allowed to stand preferably without the application of external heat until the reaction for the production of the amino-fatty acids from the protein material is completed, usually for from 20 to 30 minutes. The gelatinous matter resulting from the treatment of the cellulose and that from the protein matter employed serves to modify the amino-fatty acids produced so that they will have increased viscosity and suitability for use as a detergent. I prefer, however, to still further modify the amino-fatty acids by adding to the composition thus produced and thoroughly mixing therewith at a preferred temperature of about 300° F. for approximately 20 to 30 minutes approximately equal parts by weight of starch or starch containing material preferably corn meal. The resulting product in which the starch has become swollen, structureless and what I term gelatinous is substantially soluble in water and the detergent thus produced may be employed in semiliquid form or it may be dried to a thick pasty consistence or to solid form and so used. If the detergent is produced in solid form I prefer to grind it to a powdered condition for use.

I have found in practice that a more satisfactory embodiment of my invention may be produced by the employment of certain additional reagents and certain modifications in the process herein before set forth.

In the preferred practice of my process I heat to about 300° F. for about 30 minutes in a steam jacketed kettle, soap stock, a by-product obtained from the refining of vegetable oils, preferably purified soap stock from the refining of cottonseed oil, this product being commonly called "cottonseed mucilage", and powdered sodium sesqui-carbonate $Na_4H_2(CO_3)_3.3H_2O$, powdered tri-sodium phosphate, $Na_3PO_4.12H_2O$, and water in the approximate proportion of 28 parts by weight of the soap stock, 28 parts by weight of the sesqui-carbonate, 28 parts by weight of the phosphate and 12 parts by weight of water. The resulting product is a homogeneous mass light yellow to white in color and having when cold, the consistency of a rather wet dough.

In another vessel I produce the modified or partially modified amino-fatty acids by first acting upon cottonseed meal or soy bean meal, or both, with a gelatinizing agent preferably about 1 per cent. by weight of acetin, adding an approximately equal weight of protein matter and treating with a relatively small quantity of alkali as herein before described. I then add the amino-fatty acid composition thus produced to the contents of the first vessel preferably in the approximate proportions of 5 parts by weight of the former to 100 parts by weight of the latter and to the mixture I preferably also add approximately 5 parts by weight of corn meal. The starch present in the corn meal upon being added to the mass and thoroughly stirred therewith at an elevated temperature as hereinafter described is acted upon by the amino-fatty acids or possibly by some other material present as for example uncombined acetin, and swells, loses its starch structure and becomes substantially gelatinized, finally apparently entering into such an association or combination with one or more of the other ingredients present as to lose its identity. A microscopic examination of the product as produced for sale showed no starch present. The mass is then thoroughly agitated preferably in a crutcher of the type well known in the soap industry, for from approximately 20 to 30 minutes at a preferred temperature of about 250° F. The product is a syrup like liquid which is removed from the crutcher and allowed to harden. In about one hour it hardens or sets into a dense solid form. This solid product is then ground to powdered form and is ready for use. I preferably grind the product to a fine powder for use. The complete preferred process as above set forth and as now commercially practiced including the hardening or setting of the finished product and grinding, requires only about two hours.

While I have employed the term "amino-fatty acids" herein since it is believed that a number of such acids are produced from protein matter by the reaction of an acid, an alkali or other amino-fatty acid producing reagent thereon, it is to be understood that this term is employed generically to not only include a plurality of such acids but a single amino-fatty acid as well as soluble amino-fatty acid esters or other derivatives having a simple genetic relation to amino-fatty acids or to a single acid of this class.

I have found that the process as set forth in the first detailed illustrative example and in the preferred example given above can be widely varied and that several of the materials can be omitted or other materials employed in lieu thereof. For example, the precise order of the steps outlined is not essential to the production of an efficient detergent in accordance with my invention as hereinafter defined in the appended claims. Some measure of success is obtainable by the use of the amino-fatty acids without the employment of the modifying agents. The amino-fatty acids may, with some measure of success, be employed in combination with other materials as for example in the form of their esters so that the term "amino-fatty acids" as herein employed in the appended claims is sufficiently broad to include water soluble esters and other water soluble derivatives of the amino-fatty acids having detergent properties.

The sesqui-carbonate of soda can be used alone in the saponification step and fairly satisfactory results obtained. Similarly other saponifying agents than the preferred sesqui-carbonate of soda, and tri-sodium phosphate can be used with some measure of success but additional quantities are preferably employed in such case depending upon the saponifying efficiency of the reagent or reagents used, although as will be understood, this is not necessary in the use of the sesqui-carbonate of other alkali metals than sodium such as potassium, or the use of other tri-alkali metal phosphates, than tri-sodium phosphate, as for example tri-potassium phosphate.

Oils, fats and greases may, if desired, be employed with some measure of success in the practice of my process in place of the soap stock but I prefer to use the latter as the source of fatty acid glycerid from which the soap is to be produced by the action of the saponifying agent employed.

Only one gelatinous material need be employed in producing the modified amino-fatty acids but I prefer to employ gelatine, preferably gelatine liberated or present in the product in the production of the amino-fatty acids from gelatine containing materials, gelatinized cellulose and what I term gelatinized starch as by their use I have obtained a more satisfactory product.

Gelatinized cellulose and particularly that produced by the action of acetin on cellulose preferably cellulose containing vegetable seed material such as cottonseed meal, may advantageously be used with other detergent agents than amino-fatty acids as for example, ordinary soap and in such a product gelatinized starch or gelatinized starch and gelatin also may advantageously be added. Similarly the reaction products of an alkali metal sesqui-carbonate either alone but preferably with a tri-alkali metal phosphate such for example as those herein before referred to, on fatty acid glycerids such as fats, oils, soap stock and the like, is itself an efficient detergent and a valuable addition to other detergent agents than amino-fatty acids and particularly in the presence of gelatinous material.

Some measure of success in the practice of the invention may be obtained by employing cellulose and protein containing seed material such as cottonseed and soy bean meal as the sole source of protein material but better results are obtainable by using other protein matter therewith as herein described.

The preferred proportions of materials, temperature of reaction and details of procedure as hereinbefore set forth may be widely varied but I have obtained the best results by proceeding as herein before described. For example, it will be understood that the reaction of the saponifying agents on the soap stock may be conducted at a lower or higher temperature but I prefer to conduct this step of the process at around 300° F.

My product has high colloidal activity and emulsifying properties. It contains a large proportion of high tension colloids and turns grease and oil into finite globules of extremely small size which are readily dissolved thereby freeing the dirt or other matter held thereby. Its action on deposits, coatings, scale, stains and the like other than dirt is believed to be similar to its action in removing dirt; that is to say, the materials of such deposits, coatings, scales, stains and the like are believed to be disintegrated into minute particles by the colloidal action or bombardment of the detergent and thereby rendered readily removable.

My product is adapted for cleaning the skin, all woven and other textile fabrics, cotton, silk and wool fibers, metal, wood, cork, leather, rubber and composition surfaces, varnished, painted and other composition coated surfaces, washing bottles, dishes and the like, removing boiler and oxid scale and carbon containing and other deposits from boilers, radiators, water jackets, steam and water systems, gas meters and the like, removing calcium soap and other alkaline earth metal salt and ester deposits from laundry machinery and other objects to be freed therefrom, removing blood and iodine and other medicinal stains from the skin and elsewhere, removing core binder and other deposits or coatings from steel, aluminum and other metals in molding, metal working and other manufacturing industries, cleaning taps, dies and other tools, cleaning type, printing and engraving plates and the like, removing oil and grease from car journal wool, cotton waste, wiping rags and the like, and for all purposes for which a saponaceous, solvent or other detergent may be employed.

The product acts rapidly and efficiently in cleaning even when used in hard or salt water either hot or cold and has little or no harmful effect upon fibers and fabrics upon which it is used. In its use little rubbing, agitation or the like is required and it is particularly effective in the removal of dirt, deposits, scale, etc., from inaccessible places such as the interior of radiators, boilers, water systems, gas meters and the like. It is destructive to insects but harmless to animals and has powerful germicidal and deodorizing action, rendering its use in laundries and hospitals advantageous.

My product also may be successfully employed for degumming silk, as a highly efficient emulsifying agent notably in making relatively permanent petroleum and other oil emulsions for insecticidal use and in making relatively stable emulsions of lubricating oils for the production of economical and efficient lubricants, as a water softener and incrustation preventing boiler compound and it is an efficient agent in metal cutting compounds and either alone or in the form of an emulsion of lubricating oils or other emulsifiable lubricating agents, as an addition to light or heavy lubricants.

It is to be understood that the invention is not limited to the precise procedure, proportions or ingredients, and particular compositions set forth in the illustrative and preferred examples herein before set forth but that it contemplates within its spirit and scope the practice and products set forth broadly and specifically in the appended claims.

I claim:

1. A detergent composition comprising amino-fatty acids and gelatinous material, including gelatinized cellulose.

2. A detergent composition comprising amino-fatty acids, gelatinous material including gelatinized cellulose and gelatinized starch.

3. A detergent composition comprising amino-fatty acids, gelatinous material including gelatinized cellulose, gelatinized starch, and gelatin.

4. A detergent composition comprising amino-fatty acids and gelatinous material including the reaction products of acetin on cellulose.

5. A detergent composition comprising amino-fatty acids and gelatinous material including the reaction products of acetin on cellulose containing vegetable seed material.

6. A detergent composition comprising amino-fatty acids and gelatinous material including the reaction product of acetin on cottonseed meal.

7. A detergent composition comprising amino-fatty acids and gelatinous material including gelatinized starch and the reaction product of acetin on cellulose.

8. A detergent composition comprising amino-fatty acids and gelatinous material including gelatinized starch and the reaction product of acetin on cellulose containing vegetable seed material.

9. A detergent composition comprising amino-fatty acids, gelatinous material and soap.

10. A detergent composition comprising amino-fatty acids, gelatinous material and the reaction product of an alkali metal sesquicarbonate on a fatty acid glycerid.

11. A detergent composition comprising amino-fatty acids, gelatinous material and the reaction product of an alkali metal sesqui-carbonate and a tri-alkali metal phosphate on a fatty acid glycerid.

12. A detergent composition comprising amino-fatty acids, gelatinous material including gelatinized cellulose, and the reaction products of an alkali metal sesqui-carbonate and a tri-alkali metal phosphate on a fatty acid glycerid.

13. A detergent composition comprising amino-fatty acids, gelatinous material including gelatinized cellulose, gelatinized starch and the reaction products of an alkali metal sesqui-carbonate and a tri-alkali metal phosphate on a fatty acid glycerid.

14. A detergent composition comprising amino-fatty acids, gelatinous material including gelatinized cellulose, gelatinized starch and gelatine, and the reaction products of an alkali metal sesqui-carbonate and a tri-alkali metal phosphate on a fatty acid glycerid.

15. The herein described process of preparing a detergent comprising subjecting cellulose to the action of a cellulose gelatinizing agent, adding protein matter thereto and reacting upon the material to transform the protein matter into amino-fatty acids.

16. The herein described process of preparing a detergent comprising subjecting cellulose containing vegetable seed material to the action of a cellulose gelatinizing agent, adding protein matter thereto and reacting upon the material to transform the protein matter into amino-fatty acids.

17. The herein described process of preparing a detergent comprising subjecting cellulose and protein containing vegetable seed material to the action of a cellulose gelatinizing agent, adding protein matter thereto and reacting upon the material to transform the protein matter into amino-fatty acids.

18. The herein described process of preparing a detergent comprising subjecting cotton seed meal to the action of a cellulose gelatinizing agent, adding protein matter thereto and reacting upon the material to transform the protein matter into amino-fatty acids.

19. The herein described process of preparing a detergent comprising subjecting cellulose to the action of acetin, adding protein matter thereto and reacting upon the material to transform the protein matter into amino-fatty acids.

20. The herein described process of preparing a detergent comprising subjecting cellulose containing seed material to the action of acetin, adding protein matter thereto and reacting upon the material to transform the protein matter into amino-fatty acids.

21. The herein described process of preparing a detergent comprising subjecting cellulose and protein containing seed material to the action of acetin, adding protein matter thereto and reacting upon the material to transform the protein matter into amino-fatty acids.

22. The herein described process of preparing a detergent comprising subjecting cellulose to the action of a cellulose gelatinizing agent, adding protein matter thereto, reacting upon the material to transform the protein matter into amino-fatty acids and adding starchy material thereto.

23. The herein described process of preparing a detergent comprising subjecting cellulose to the action of a cellulose gelatinizing agent, adding protein matter thereto, reacting upon the material to transform the protein matter into amino-fatty acids and adding corn meal thereto.

24. The herein described process of preparing a detergent comprising subjecting cellulose to the action of a cellulose gelatinizing agent, adding protein matter thereto, reacting upon the material to transform the protein matter into amino-fatty acids and mixing the resulting mass with the reaction product of a fatty acid glycerid and a saponifying agent.

25. The herein described process of preparing a detergent comprising subjecting cellulose to the action of a cellulose gelatinizing agent, adding protein matter thereto, reacting upon the material to transform the protein matter into amino-fatty acids and mixing the resulting mass with the reaction product of a fatty acid glycerid and a saponifying agent comprising an alkali metal sesqui-carbonate.

26. The herein described process of preparing a detergent comprising subjecting cellulose to the action of a cellulose gelatinizing agent, adding protein matter thereto, reacting upon the material to transform the protein matter into amino-fatty acids and mixing the resulting mass with the reaction product of a fatty acid glycerid and a saponifying agent comprising an alkali metal sesqui-carbonate and a tri-alkali metal phosphate.

27. The herein described process of preparing a detergent comprising subjecting cellulose to the action of a cellulose gelatinizing agent, adding protein matter thereto, reacting upon the material to transform the protein matter into amino-fatty acids and mixing the resulting mass with the reaction product resulting from reacting upon soap stock with sodium sesqui-carbonate and tri-sodium phosphate.

28. The herein described process of preparing a detergent comprising subjecting cellulose containing seed material to the action of a cellulose gelatinizing agent, adding protein matter thereto, reacting upon the material to transform the protein matter into amino-fatty acids and mixing the resulting mass with the reaction product resulting from the reaction of a fatty acid glycerid with an alkali metal sesqui-carbonate and a tri-alkali metal phosphate.

29. The herein described process of preparing a detergent comprising subjecting a cellulose and protein containing vegetable seed material to the action of a cellulose gelatinizing agent, adding protein matter thereto, reacting upon the material to transform the protein matter into amino-fatty acids and mixing the resulting mass with the reaction product resulting from the reaction of a fatty acid glycerid with an alkali metal sesqui-carbonate and a tri-alkali metal phosphate.

30. The herein described process of preparing a detergent comprising subjecting cottonseed meal to the action of a cellulose gelatinizing agent, adding protein matter thereto, reacting upon the material to transform the protein matter into amino-fatty acids and mixing the resulting mass with the reaction product resulting from the reaction of a fatty acid glycerid with an alkali metal sesqui-carbonate and a tri-alkali metal phosphate.

31. The herein described process of preparing a detergent comprising subjecting a cellulose and protein containing vegetable seed meal to the action of a small proportion of acetin, adding protein matter thereto, reacting upon the material with a small proportion of an akali to transform the protein matter into amino-fatty acids, adding starch to the resulting mass, adding the resulting mass to the product resulting from the reaction of sodium sesqui-carbonate and tri-sodium phosphate upon saponifiable fatty material, thoroughly mixing the product and allowing it to harden.

32. In the herein described process of preparing a detergent the steps of subjecting cellulose and protein containing vegetable seed material to the action of a cellulose gelatinizing agent and to the action of a relatively small amount of an akali to transform the protein matter into amino-fatty acids.

33. In the herein described process of preparing a detergent the steps of subjecting cellulose and protein containing vegetable seed meal to the action of acetin and to the action of a relatively small amount of an alkali adapted to transform the protein matter into amino-fatty acids.

34. A detergent composition comprising amino-fatty acids and gelatinous material.

In testimony whereof I affix my signature.

LOUIS T. BUSSLER.